United States Patent
Yun et al.

(10) Patent No.: US 10,057,527 B2
(45) Date of Patent: Aug. 21, 2018

(54) ANALOG-DIGITAL CONVERTER AND METHOD, AND IMAGE SENSOR INCLUDING THE SAME

(71) Applicant: SK hynix Inc., Gyeonggi-do (KR)

(72) Inventors: Gun-Hee Yun, Gyeonggi-do (KR); Hyun-Mook Park, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 0 days.

(21) Appl. No.: 15/252,008

(22) Filed: Aug. 30, 2016

(65) Prior Publication Data
US 2017/0223295 A1    Aug. 3, 2017

(30) Foreign Application Priority Data
Jan. 29, 2016   (KR) .................. 10-2016-0011331

(51) Int. Cl.
H04N 5/378    (2011.01)
H04N 5/3745   (2011.01)

(52) U.S. Cl.
CPC ......... H04N 5/378 (2013.01); H04N 5/37455 (2013.01)

(58) Field of Classification Search
CPC ..................... H04N 5/378; H04N 5/37455
See application file for complete search history.

(56) References Cited

U.S. PATENT DOCUMENTS

| | | | | |
|---|---|---|---|---|
| 2008/0284626 | A1* | 11/2008 | Hattori ................ | H03M 1/129 341/133 |
| 2008/0297636 | A1* | 12/2008 | Mizuguchi ........... | H04N 5/347 348/294 |
| 2010/0225796 | A1* | 9/2010 | Lim .................... | H03M 1/0607 348/308 |
| 2014/0078360 | A1* | 3/2014 | Park ...................... | H04N 5/355 348/294 |

FOREIGN PATENT DOCUMENTS

KR    1020060087130    8/2006

* cited by examiner

*Primary Examiner* — Mekonnen Dagnew
(74) *Attorney, Agent, or Firm* — IP & T Group LLP

(57) ABSTRACT

An analog-digital converter may include a comparator suitable for comparing an input signal to a ramp signal to repetitively output a comparison signal a number of times corresponding to an analog gain for an analog-digital conversion; a counter receiving the repetitively outputted comparison signal from the comparator, the counter being suitable for performing a counting operation based on the repetitively outputted comparison signal; and a counting limiter suitable for limiting the counted number of bits by a maximum counted bit number of the counter.

18 Claims, 4 Drawing Sheets

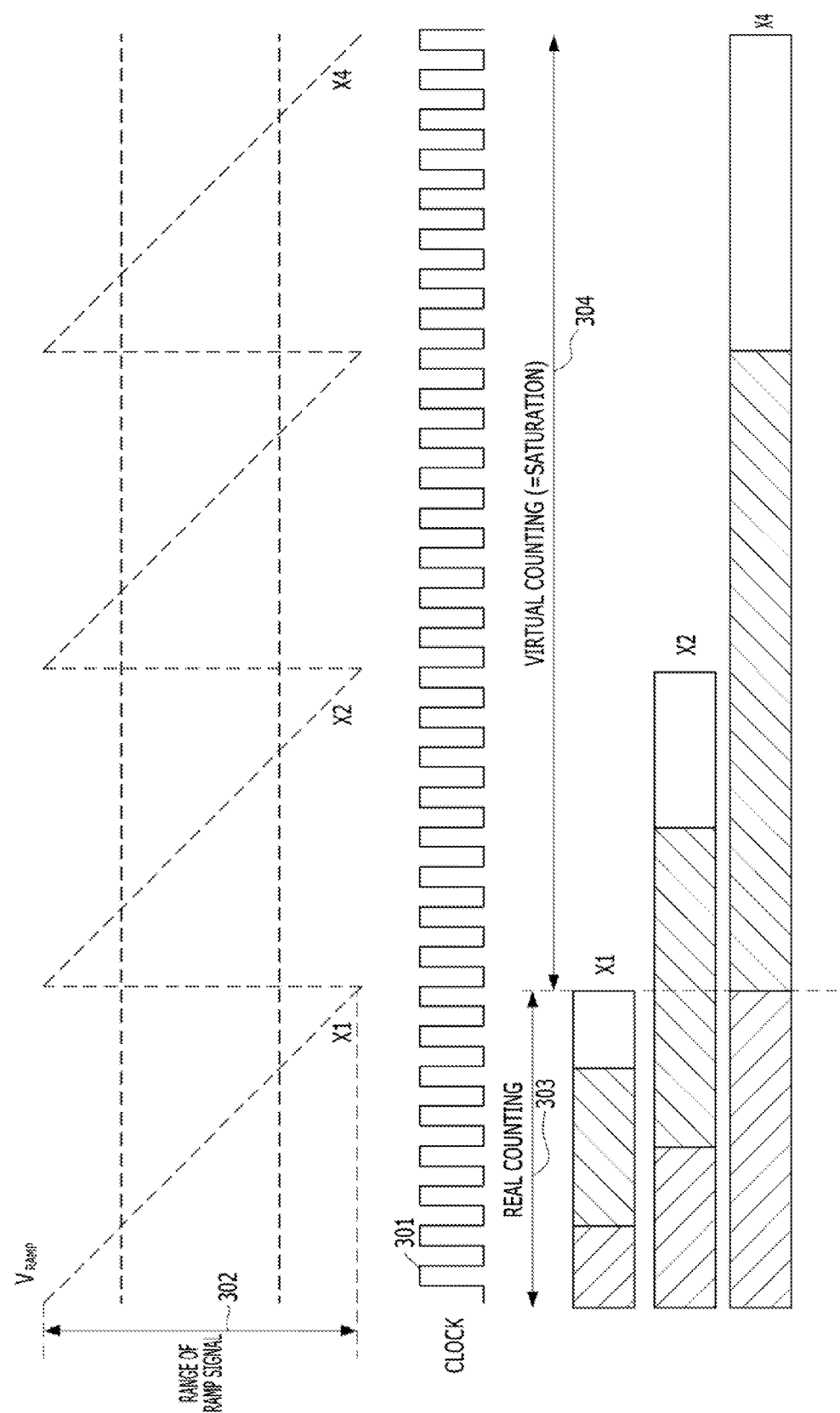

ANALOG-DIGITAL CONVERTER AND METHOD, AND IMAGE SENSOR INCLUDING THE SAME

CROSS-REFERENCE TO RELATED APPLICATIONS

The present application claims priority of Korean Patent Application No. 10-2016-0011331 filed on Jan. 29, 2016, which is incorporated herein by reference in its entirety.

BACKGROUND

1. Field

Exemplary embodiments of the present invention relate to an analog-digital converter and an image sensor including the same.

2. Description of the Related Art

Analog-digital converters are generally used in an image sensor, such as a complementary metal oxide semiconductor (CMOS) image sensor, to convert a pixel signal generated from a pixel array into a pixel data.

For increasing the analog gain of a conventional analog-digital converter, a separate pre-amplifier is typically added, or the range of a ramp signal (i.e., a reference voltage) is reduced.

However, adding a pre-amplifier increases the circuit area and power consumption of the analog-digital converter. Furthermore, reducing the range of a ramp signal may also lower the level of the ramp signal, which may render the ramp signal vulnerable to noise. Hence, reducing the ramp signal range is problematic in that the signal to noise ratio (SNR) is degraded.

SUMMARY

Various embodiments of the present invention are directed to an analog-digital converter, a method for performing counting of a comparison result, which is repeated by times corresponding to an analog gain for an analog-digital conversion with discarding an overflow in a counted value, while maintaining the range of a ramp signal and the clock speed, and an image sensor including the same.

In an embodiment, an analog-digital converter may include a comparator suitable for comparing an input signal to a ramp signal to repetitively output a comparison signal a number of times corresponding to an analog gain for an analog-digital conversion a counter receiving the repetitively outputted comparison signal from the comparator, the counter being suitable for performing a counting operation based on the repetitively outputted comparison signal; and a counting limiter suitable for limiting the counted number of bits by a maximum counted bit number of the counter.

In an embodiment, an analog-digital converter may include a comparator suitable for comparing an input signal to a ramp signal to repetitively output a comparison signal by times corresponding to an analog gain for an analog-digital conversion; a counter suitable for performing a counting operation based on the repetitively outputted comparison signal, and an overflow detector suitable for detecting an overflow of the counter based on a carry-out signal generated from the counter.

In an embodiment, an analog-digital converting method may include comparing an input signal to a ramp signal to repetitively output a comparison signal by times corresponding to an analog gain; performing a counting operation based on the repetitively outputted comparison signal; and limiting the counted number of bits by a maximum counted bit number of the counter operation.

In an embodiment, an analog-digital converting method may include comparing an input signal to a ramp signal to repetitively output a comparison signal by times corresponding to an analog gain; performing a counting operation based on the repetitively outputted comparison signal; and detecting an overflow of the counting operation based on a carry-out signal generated by the counting operation.

In an embodiment, an image sensor may include a pixel suitable for outputting a pixel signal corresponding to incident light, a row decoder suitable for selecting the pixel; a ramp signal generator suitable for generating a ramp signal having a waveform repeated by times corresponding to an analog gain for an analog-digital conversion; a comparator suitable for comparing the pixel signal to the ramp signal to repetitively output a comparison signal by the times corresponding to the analog gain; a counter suitable for performing a counting operation based on the repetitively outputted comparison signal; a counting limiter suitable for limiting the counted number of bits by a maximum counted bit number of the counter; a memory suitable for storing counting information generated from the counter; a column readout circuit suitable for outputting the counting information stored in the memory; and a control unit suitable for controlling the operations of the row decoder, the ramp signal generator, the counter, the memory, and the column readout circuit.

In an embodiment, an image sensor may include a pixel suitable for outputting a pixel signal corresponding to incident light; a row decoder suitable for selecting the pixel; a ramp signal generator suitable for generating a ramp signal having a waveform repeated by times corresponding to an analog gain for an analog-digital conversion; a comparator suitable for comparing the pixel signal to the ramp signal to repetitively output a comparison signal by the times corresponding to the analog gain; a counter suitable for performing a counting operation based on the repetitively outputted comparison signal; an overflow detector suitable for detecting an overflow of the counter based on a carry-out signal generated from the counter; a memory suitable for storing counting information generated from the counter; a column readout circuit suitable for outputting the counting information stored in the memory; and a control unit suitable for controlling the operations of the row decoder, the ramp signal generator, the counter, the memory, and a column readout circuit.

BRIEF DESCRIPTION OF THE DRAWINGS

FIG. 3 is a diagram for describing a gain increasing method in accordance with an embodiment of the present invention.

DETAILED DESCRIPTION

Figure 1:
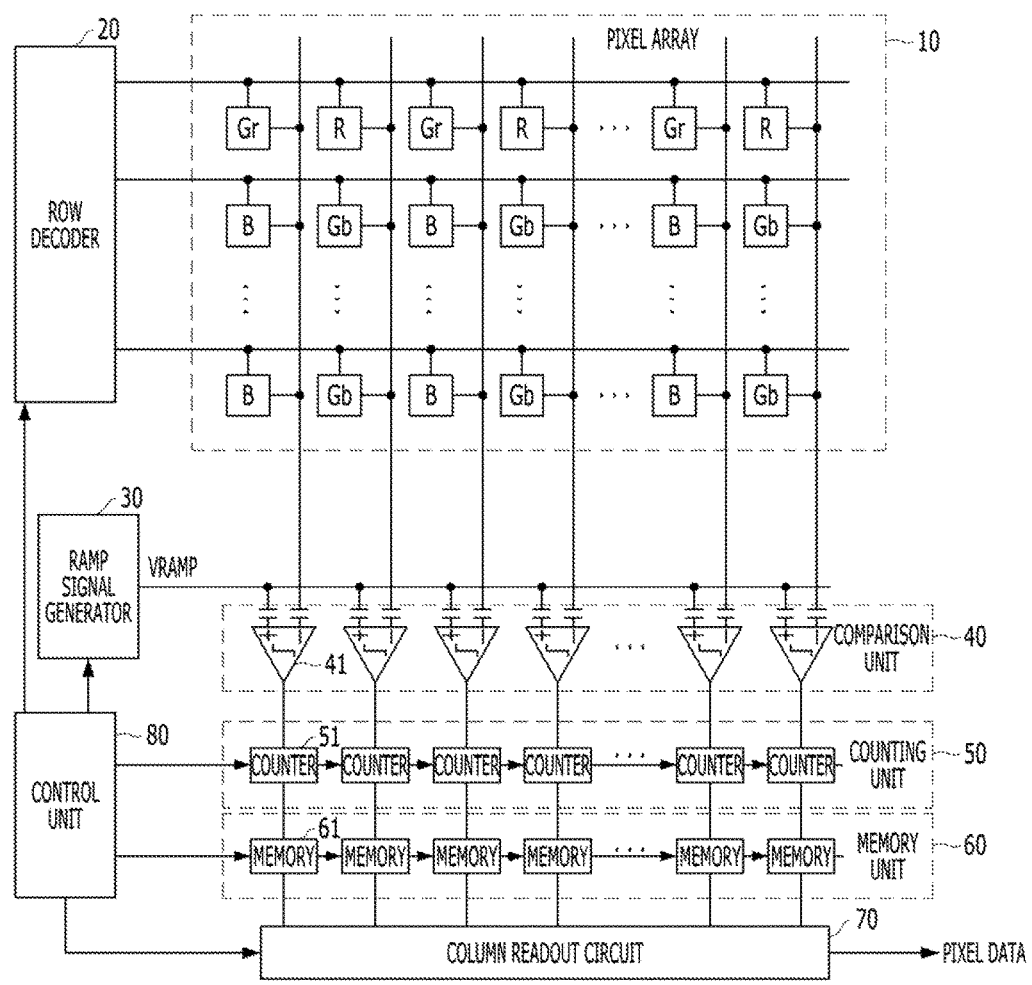
FIG. 1 is a diagram illustrating a CIS in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Throughout the specification, when an element is referred to as being "coupled" to another element, it may not only indicate that the elements are "directly coupled" to each other, but also indicate that the elements are "electrically coupled" to each other with another element interposed therebetween.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily drawn to scale and, in some instances, proportions may have been exaggerated in order to clearly illustrate features of the embodiments.

The terminology used herein is for the purpose of describing particular embodiments only and is not intended to be limiting of the present invention. As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth for providing a thorough understanding of the present invention. The present invention may be practiced without some or all of these specific details. In other instances, well-known process structures and/or processes have not been described in detail to avoid unnecessarily obscuring the present disclosure.

It is also noted, that in some instances, as would be apparent to those skilled in the relevant art to which the present invention pertains, a feature or element described in connection with one embodiment may be used singly or in combination with other features or elements of another embodiment, unless otherwise specifically indicated.

Hereinafter, the various embodiments of the present invention will be described in detail with reference to the attached drawings.

Referring now to FIG. 1, a CIS is provided in accordance with an embodiment of the present invention. FIG. 1 illustrates a CIS having a general column-parallel architecture.

As illustrated in FIG. 1, the CIS includes a pixel array 10, a row decoder 20, a ramp signal generator 30, a comparison unit 40, a counting unit 50, a memory unit 60, a column readout circuit 70, and a control unit 80. In operation, the pixel array 10 outputs a pixel signal corresponding to incident light. The row decoder 20 may select a pixel within the pixel array 10 at each row line under the control of the control unit 80 (for example, including a timing generator), and control the operation of the selected pixel. The ramp signal generator 30 may generate a ramp signal $V_{RAMP}$ under the control of the control unit 80 and transmit the ramp signal $V_{RAMP}$ to the comparison unit 40. The comparison unit 40 may compare each pixel signal received from the pixel array 10 to the ramp signal $V_{RAMP}$ applied from the ramp signal generator 30. The counting unit 50 may count a clock applied from the control unit 80 during a period determined by each output signal of the comparison unit 40. The memory unit 60 may store counting information provided from the counting unit 50 under the control of the control unit 80. The control unit 80 may control the operations of the row decoder 20, the ramp signal generator 30, the counting unit 50, the memory unit 60 and the column readout circuit 70. The column readout circuit 70 may sequentially output data of the memory unit 60 as pixel data PXDATA under the control of the control unit 80.

In order to remove an offset value of each pixel, the CIS may compare pixel signals (i.e., pixel output voltages) before and after light is incident, and measure only the pixel signal which is generated by the actual incident light. Such a technique may be referred to as Correlated Double Sampling (CSS). Such a CDS function may be performed by the comparison unit 40.

The comparison unit 40 may include a plurality of comparators 41, the counting unit 50 may include a plurality of counters 51 and the memory unit 60 may include a plurality of memories 61. That is, a comparator, a counter and a memory may be assigned for each column of the pixel array 10.

Figure 2A:
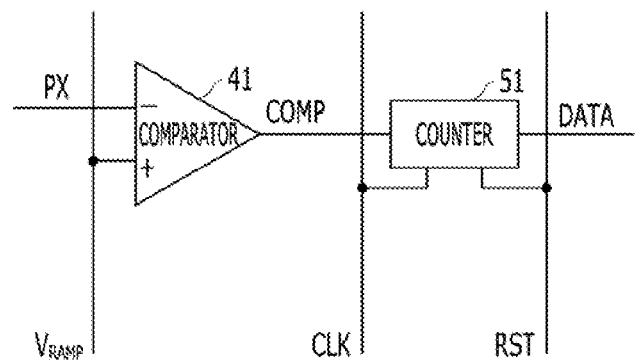
FIG. 2A is a partial circuit diagram for describing an analog-digital converting operation in the CIS shown in FIG. 1.

FIG. 2A is a partial circuit diagram for describing an analog-digital converting operation in the CIS shown in FIG. 1. An operation of one comparator and one counter, corresponding to one column, will be described as follows.

The first comparator 41 may receive a pixel signal PX outputted from the first column of the pixel array 10 through a first terminal thereof. The first comparator 41 may also receive a ramp signal $V_{RAMP}$ applied from the ramp signal generator 30 through a second terminal thereof, and output a comparison signal COMP by comparing the values of the two signals.

Since the ramp signal $V_{RAMP}$ has a voltage level which ramps (i.e., fails or rises) as time passes, the values of the two signals inputted to the comparator coincide with each other at a certain point in time. After the point in time that the values of the two signals coincide with each other, the value of the comparison signal outputted from the comparator may be inverted.

Thus, the first counter 51 may count the clock CLK applied from the control unit 80 from the point in time that the ramp signal falls (or rises) to the point in time that the comparison signal outputted from the comparator 41 is inverted, and output counting information DATA. The counter 51 may be reset in response to a reset signal RST from the control unit 80.

Since the counter 51 is an N-bit counter which cannot be operated at bits greater than N bit where N is a natural number, the counter 51 does not need to care of an overflow in a counted value.

Figure 2B:
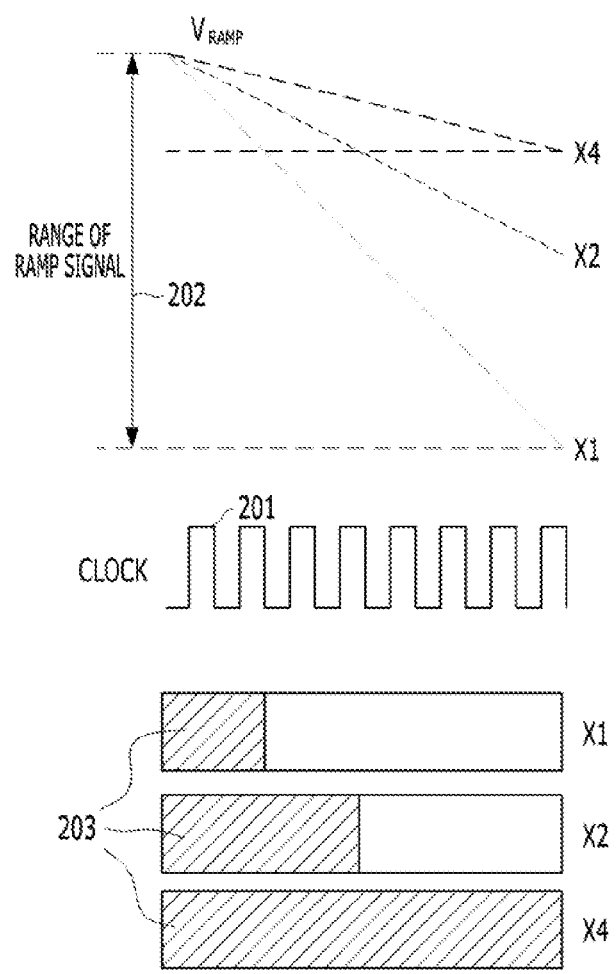
FIG. 2B is a diagram for describing a gain increasing method.

FIG. 2B is a diagram for describing a gain increasing method.

As illustrated in FIG. 2B, the range 202 of a ramp signal may be reduced based on an analog gain of an analog-digital converter, for increasing the analog gain when the frequency of a clock 201 is fixed. That is, when the gain is '2' (×2), the range of the ramp signal corresponds to ½ of the range of the ramp signal at a unit gain (×1), and when the gain is '4' (×4), the range of the ramp signal corresponds to ¼ of the range of the ramp signal at the unit gain (×1).

As the analog gain is increased, the number 203 of bits which are actually counted by a counter increases proportionally to the gain That is, in the case of the double gain (×2), the number of counted bits is two times greater than the number of counted bits at a unit gain (×1), and in the case of the quadruple gain (×4), the number of counted bits is four times larger than the number of counted bits at the unit gain (×1).

However, the method for reducing the range of a ramp signal has a concern in that a ratio of signal to noise is lowered to degrade the SNR.

The present invention avoids this, by holding the range of a ramp signal and the clock speed constant while increasing the analog gain of an analog-digital converter. More specifically an embodiment of the present invention includes holding the range of a ramp signal and the clock speed constant while increasing the analog gain of an analog-digital converter, counting a clock during a period determined by a comparison signal which is repeated by the number of times corresponding to the analog gain increase, and discarding an overflow in a counted value, thereby increasing the analog gain without deteriorating other analog characteristics. This will be described in more detail with reference to FIGS. 3 to 5.

FIG. 3 is a diagram for describing a gain increasing method in accordance with an embodiment of the present invention.

As illustrated in FIG. 3, the range 302 of a ramp signal and the frequency of a clock 301 are fixed. A clock is counted based on a comparison signal, which is repeated by the number of times corresponding to a gain, and an overflow in a counted value is discarded, for increasing an analog gain. That is, in the case of a double gain (×2), counting may be repeated two times, and an overflow in a counted value may be discarded. In the case of a quadruple gain (×4), counting may be repeated four times, and an overflow in a counted value may be discarded.

The number of virtually counted bits (hereafter, referred to as virtual counted bit number 304) increases corresponding to the gain. The virtual counted bit number is discarded as an overflow in a counted value. Therefore, the number of actually counted bits (hereafter, referred to as real counted bit number 303) may have the same value regardless of the increase of the analog gain.

The maximum counted bit number MAX_Count is provided by Equation 1 below.

$$\text{MAX\_Count} = 2^N - AG \qquad \text{[Equation 1]}$$

wherein, 'N' represents the bit number of the counter, and 'AG' represents the analog gain.

According to Equation 1, the maximum counted bit number is $2^N$ at a unit gain (×1), 2N+1 at a double gain (×2), and 2N+2 at a quadruple gain (×4).

In accordance with the present embodiment, however, since the virtual counted bit number (i.e., an overflow in the counted value) is discarded, the real counted bit number 303 (i.e., a maximum counted bit number) may have the same value of 2N even though the analog gain is '2' or '4'.

When the analog gain increases, the analog characteristic may be improved due to the multi-sampling effect.

Figure 4:
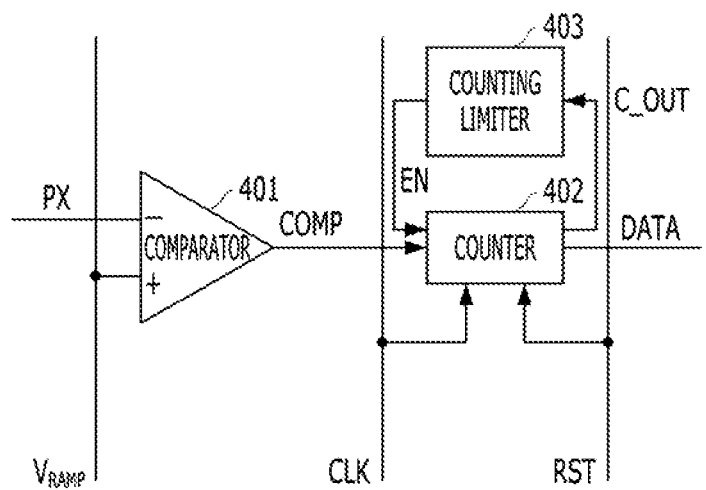
FIG. 4 is a diagram illustrating an analog-digital converter in accordance with an embodiment of the present invention.

FIG. 4 is a diagram illustrating an analog-digital converter in accordance with an embodiment of the present invention. FIG. 4 merely shows the configuration corresponding to one column.

As illustrated in FIG. 4, the analog-digital converter may include a comparator 401, a counter 402 and a counting limiter 403. The comparator 401 may compare a pixel signal PX to a ramp signal $V_{RAMP}$, and repetitively output a comparison signal COMP by a number of times corresponding to a gain, that is, a waveform of the ramp signal $V_{RAMP}$ is repeated by the number of times corresponding to the gain for one row time. The counter 402 may perform a counting operation during a period determined by the comparison signal COMP. The counting limiter 403 may limit the counted bit number of the counter 402 to a real counted bit number (i.e., a maximum counted bit number).

Since the waveform of the ramp signal $V_{RAMP}$ of which the voltage level falls (or rises), is repeated based on the gain for one row time, a point in time that the values of two signals inputted to the comparator coincide with each other may repetitively occur. After the point in time that the values of the two signals coincide with each other, the value of the comparison signal outputted from the comparator may be inverted.

Therefore, the counter 402 may repeat counting of the clock CLK from when the ramp signal falls (or rises) to when the comparison signal is inverted, by a number of times corresponding to the gain, and output counting information DATA and a carryout signal C_OUT. The counter 402 may be reset in response to a reset signal RST.

The entire structure of the counter 402 may be modified into a non-overflow structure. For example, the counter 402 may be implemented with an N-bit, non-overflow counter.

The counting limiter 403 may disable the counter 402 to stop counting, when the counter 402 counts the real counted bit number (i.e., a maximum counted bit number) even before the repeated counting is completed. Thus, the counter 402 may stop counting, maintain the current real counted bit number, and output the counting information DATA to a digital block through a column readout circuit. Then, when a counter enable signal EN is activated as the next row time starts, the counter 402 may perform counting.

More specifically, the counting limiter 403 may receive the carry-out signal C_OUT of the last bit (i.e., the Nth carry-out bit in the case of an N-bit counter) from the counter 402, and disable the counter 402 by deactivating the counter enable signal EN. The counting limiter 403 may be implemented with a comparator.

Figure 5:
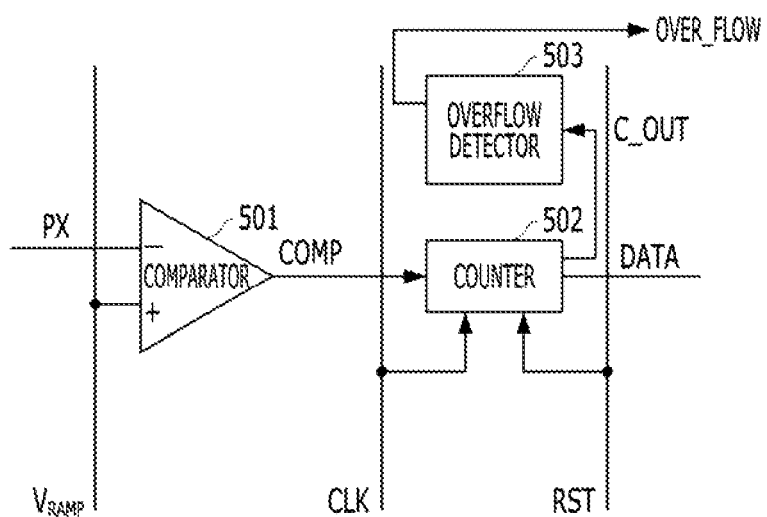
FIG. 5 is a diagram illustrating an analog-digital converter in accordance with another embodiment of the present invention.

FIG. 5 is a diagram illustrating an analog-digital converter in accordance with another embodiment of the present invention. FIG. 5 shows merely a configuration corresponding to one column.

As illustrated in FIG. 5, the analog-digital converter may include a comparator 501, a counter 502 and an overflow detector 503. The comparator 501 may compare a pixel signal PX to a ramp signal $V_{RAMP}$, and repetitively output a comparison signal COMP by a number of times corresponding to a gain, that is, a waveform of the ramp signal $V_{RAMP}$ is repeated by the number of times corresponding to the gain for one row time. The counter 502 may perform a counting operation based on the comparison signal. The overflow detector 503 may detect an overflow of the counter 502, and notify the detected overflow.

Since the comparator 501 and the counter 502 are configured and operated in similar manner to the comparator 401 and the counter 402 described with reference to FIG. 4, the detailed descriptions thereof are omitted herein. However, the counter 502 may be implemented with a ripple counter, instead of an N-bit non-overflow counter.

The overflow detector 503 may detect an overflow based on the carry-out signal C_OUT of the last bit (i.e., the Nth carry-out bit in the case of an N-bit counter), and output an overflow signal OVER_FLOW to a digital block through a column readout circuit. Then, the digital block may receive the overflow signal OVER_FLOW and process the corresponding counting information DATA with limiting by the real counted bit number (i.e., the maximum counted bit number). That is, the digital block may discard the counting information DATA after the maximum counted bit number. The overflow detector 503 may be implemented with a comparator.

When using the ripple counter, the last bit changes from a low level through a high level to a low level (low-high-low). Thus, the overflow detector 503 may detect this value to recognize an overflow, and route (or transmit) only a 1-bit signal as an overflow signal. Therefore, the overflow detector 503 may be efficiently implemented.

The analog-digital converter described with reference to FIGS. 4 and 5 may be applied to the CIS described with reference to FIG. 1.

In accordance with the embodiments of the present invention, the analog-digital converter and the CIS may increase an analog gain while maintaining the range of a ramp signal and the frequency of a clock, perform counting based on a comparison signal, which is repeated by times corresponding to the gain, and discard an overflow in a counted value. That is, the analog gain may be increased without deteriorating the analog characteristic. At a high gain, the analog characteristic may be further improved due to the multi-sampling effect.

Although various embodiments have been described for illustrative purposes, it will be apparent to those skilled in the art that various changes and modifications may be made without departing from the spirit and scope of the invention as defined in the following claims.

What is claimed is:

1. An analog-digital converter, comprising:
a comparator configured to compare an input signal to a ramp signal to repetitively output a comparison signal by times corresponding to an analog gain for an analog-digital conversion;
a counter configured to receive the repetitively outputted comparison signal from the comparator, and perform a counting operation based on the repetitively outputted comparison signal; and
a counting limiter configured to limit the counted number of bits by a maximum counted bit number of the counter,
wherein the counting operation includes a real counting and a virtual counting, a virtual counted bit number for the virtual counting increases corresponding to the analog gain, and a real counted bit number for the real counting has a same value as the maximum counted bit number regardless of the increase of the analog gain, the virtual counted bit number being discarded as an overflow in a counted value.

2. The analog-digital converter of claim 1, wherein the ramp signal has a waveform repeated by the times corresponding to the analog gain.

3. The analog-digital converter of claim 1, wherein the counter counts a clock from the start of the ramp signal to when the comparison signal is inverted, and outputs counting information and a carry-out signal.

4. The analog-digital converter of claim 3, wherein the counter comprises a non-overflow counter.

5. The analog-digital converter of claim 1, wherein the counting limiter disables the counter when the counter counts the maximum counted bit number.

6. The analog-digital converter of claim 3, wherein the counting limiter receives the carry-out signal of the last bit.

7. An analog-digital converter, comprising:
a comparator configured to compare an input signal to a ramp signal to repetitively output a comparison signal by times corresponding to an analog gain for an analog-digital conversion;
a counter configured to perform a counting operation based on the repetitively outputted comparison signal; and
an overflow detector configured to detect an overflow of the counter based on a carry-out signal generated from the counter,
wherein the counting operation includes a real counting and a virtual counting, a virtual counted bit number for the virtual counting increases corresponding to the analog gain, and a real counted bit number for the real counting has a same value regardless of the increase of the analog gain, the virtual counted bit number being discarded as the overflow in a counted value.

8. The analog-digital converter of claim 7, wherein the ramp signal has a waveform repeated by the times corresponding to the analog gain.

9. The analog-digital converter of claim 7, wherein the counter counts a clock from the start of the ramp signal to when the comparison signal is inverted, and outputs counting information and the carry-out signal.

10. The analog-digital converter of claim 7, wherein the overflow detector detects the overflow based on the carry-out signal of the last bit inputted from the counter.

11. An analog-digital converting method, comprising:
comparing an input signal to a ramp signal to repetitively output a comparison signal by times corresponding to an analog gain;
performing a counting operation based on the repetitively outputted comparison signal; and
limiting the counted number of bits by a maximum counted bit number of the counter operation,
wherein the counting operation includes a real counting and a virtual counting, a virtual counted bit number for the virtual counting increases corresponding to the analog gain, and a real counted bit number for the real counting has a same value as the maximum counted bit number regardless of the increase of the analog gain, the virtual counted bit number being discarded as an overflow in a counted value.

12. An analog-digital converting method, comprising:
comparing an input signal to a ramp signal to repetitively output a comparison signal by times corresponding to an analog gain;
performing a counting operation based on the repetitively outputted comparison signal; and
detecting an overflow of the counting operation based on a carry-out signal generated by the counting operation,
wherein the counting operation includes a real counting and a virtual counting, a virtual counted bit number for the virtual counting increases corresponding to the analog gain, and a real counted bit number for the real counting has a same value regardless of the increase of the analog gain, the virtual counted bit number being discarded as the overflow in a counted value.

13. An image sensor, comprising:
a pixel configured to output a pixel signal corresponding to incident light;
a row decoder configured to select the pixel;
a ramp signal generator configured to generate a ramp signal having a waveform repeated by times corresponding to an analog gain for an analog-digital conversion;
a comparator configured to compare the pixel signal to the ramp signal to repetitively output a comparison signal by the times corresponding to the analog gain;
a counter configured to perform a counting operation based on the repetitively outputted comparison signal;
a counting limiter configured to limit the counted number of bits by a maximum counted bit number of the counter;
a memory configured to store counting information generated from the counter;
a column readout circuit configured to output the counting information stored in the memory; and
a control unit configured to control the operations of the row decoder, the ramp signal generator, the counter, the memory, and the column readout circuit,
wherein the counting operation includes a real counting and a virtual counting, a virtual counted bit number for the virtual counting increases corresponding to the analog gain, and a real counted bit number for the real counting has a same value as the maximum counted bit number regardless of the increase of the analog gain, the virtual counted bit number being discarded as an overflow in a counted value.

14. The image sensor of claim 13, wherein the counter counts a clock applied from the control unit from when the ramp signal ramps to when the comparison signal is inverted, and outputs the counting information and a carry-out signal.

15. The image sensor of claim 13, wherein the counting limiter disables the counter when the counter counts the maximum counted bit number.

16. An image sensor, comprising:
a pixel configured to output a pixel signal corresponding to incident light;
a row decoder configured to select the pixel;
a ramp signal generator configured to generate a ramp signal having a waveform repeated by times corresponding to an analog gain for an analog-digital conversion;
a comparator configured to compare the pixel signal to the ramp signal to repetitively output a comparison signal by the times corresponding to the analog gain;
a counter configured to perform a counting operation based on the repetitively outputted comparison signal;
an overflow detector configured to detect an overflow of the counter based on a carry-out signal generated from the counter;
a memory configured to store counting information generated from the counter;
a column readout circuit configured to output the counting information stored in the memory; and
a control unit configured to control the operations of the row decoder, the ramp signal generator, the counter, the memory, and a column readout circuit,
wherein the counting operation includes a real counting and a virtual counting, a virtual counted bit number for the virtual counting increases corresponding to the analog gain, and a real counted bit number for the real counting has a same value regardless of the increase of the analog gain, the virtual counted bit number being discarded as the overflow in a counted value.

17. The image sensor of claim 16, wherein the counter counts a clock applied from the control unit from when the ramp signal ramps to when the comparison signal is inverted, and outputs the counting information and the carry-out signal.

18. The image sensor of claim 16, wherein the overflow detector detects the overflow based on the carry-out signal of the last bit inputted from the counter.

* * * * *